Dec. 11, 1928.  
P. S. MORGAN  
SHOCK ABSORBER  
Filed April 7, 1923  
1,694,788  
4 Sheets-Sheet 1

INVENTOR  
Porter S. Morgan  
BY Emery, Booth, Janney & Varney  
ATTORNEYS

Dec. 11, 1928.　　　　　P. S. MORGAN　　　　1,694,788
SHOCK ABSORBER
Filed April 7, 1923　　　4 Sheets-Sheet 2

INVENTOR
Porter S. Morgan
BY
Emery, Booth, Janney & Varney
ATTORNEYS

Dec. 11, 1928.　　　　　　　　　　　1,694,788

P. S. MORGAN

SHOCK ABSORBER

Filed April 7, 1923　　　　4 Sheets-Sheet 3

INVENTOR
Porter S. Morgan
BY
Emery, Booth, Janney & Varney
ATTORNEYS

Dec. 11, 1928.
P. S. MORGAN
1,694,788
SHOCK ABSORBER
Filed April 7, 1923
4 Sheets-Sheet 4
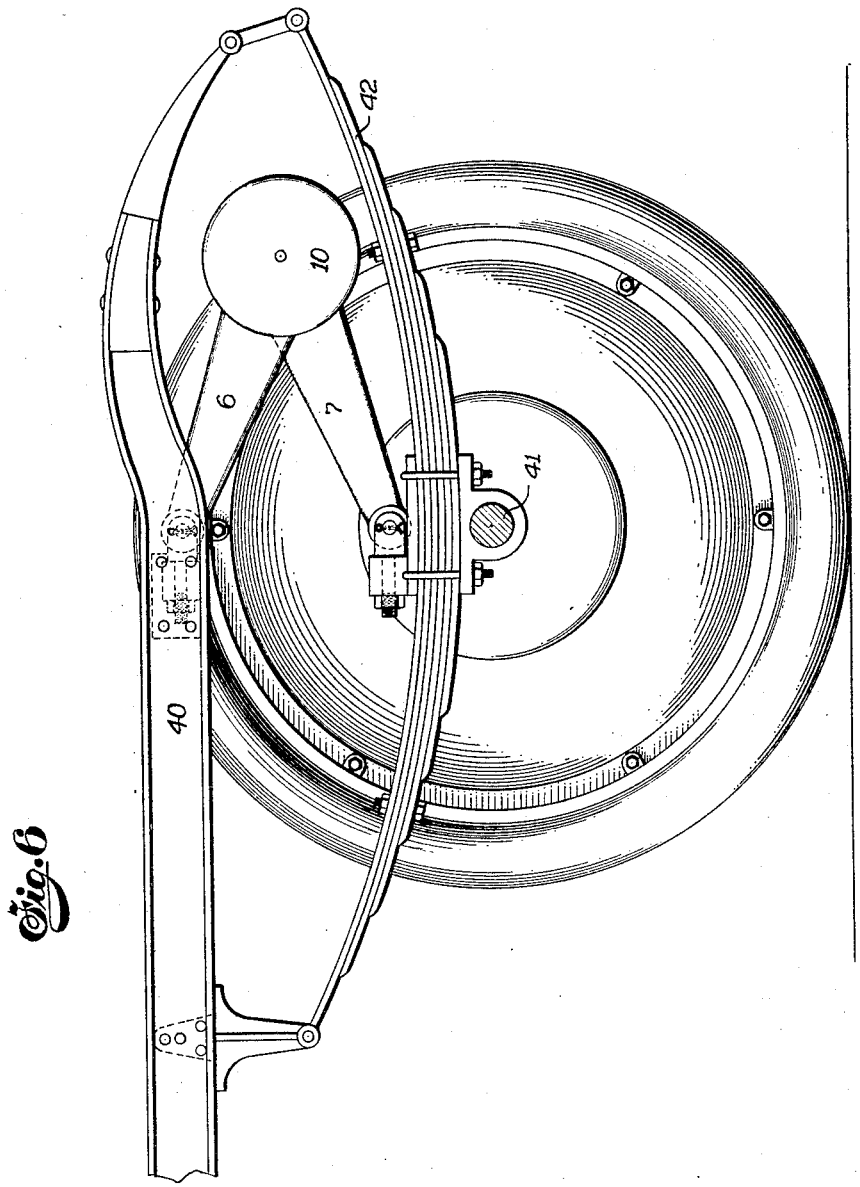
Inventor
Porter S. Morgan.
By his Attorneys
Emery, Booth, Janney & Varney Patented Dec. 11, 1928.

1,694,788

UNITED STATES PATENT OFFICE.

PORTER S. MORGAN, OF NEW YORK, N. Y., ASSIGNOR TO MORGAN BLODGETT MORGAN, INC., OF NEW YORK, N. Y., A CORPORATION OF NEW YORK.

SHOCK ABSORBER.

Application filed April 7, 1923. Serial No. 630,441

This invention relates to shock absorbers primarily useful in governing the flexure of vehicle springs, and comprises means for retarding the movements of the springs and for automatically modifying the retarding action in accordance with the force, extent and rapidity of spring movement.

The accompanying drawings illustrate one selected embodiment of the invention wherein.

Figure 6 shows the absorber attached to a vehicle.

Figure 1:
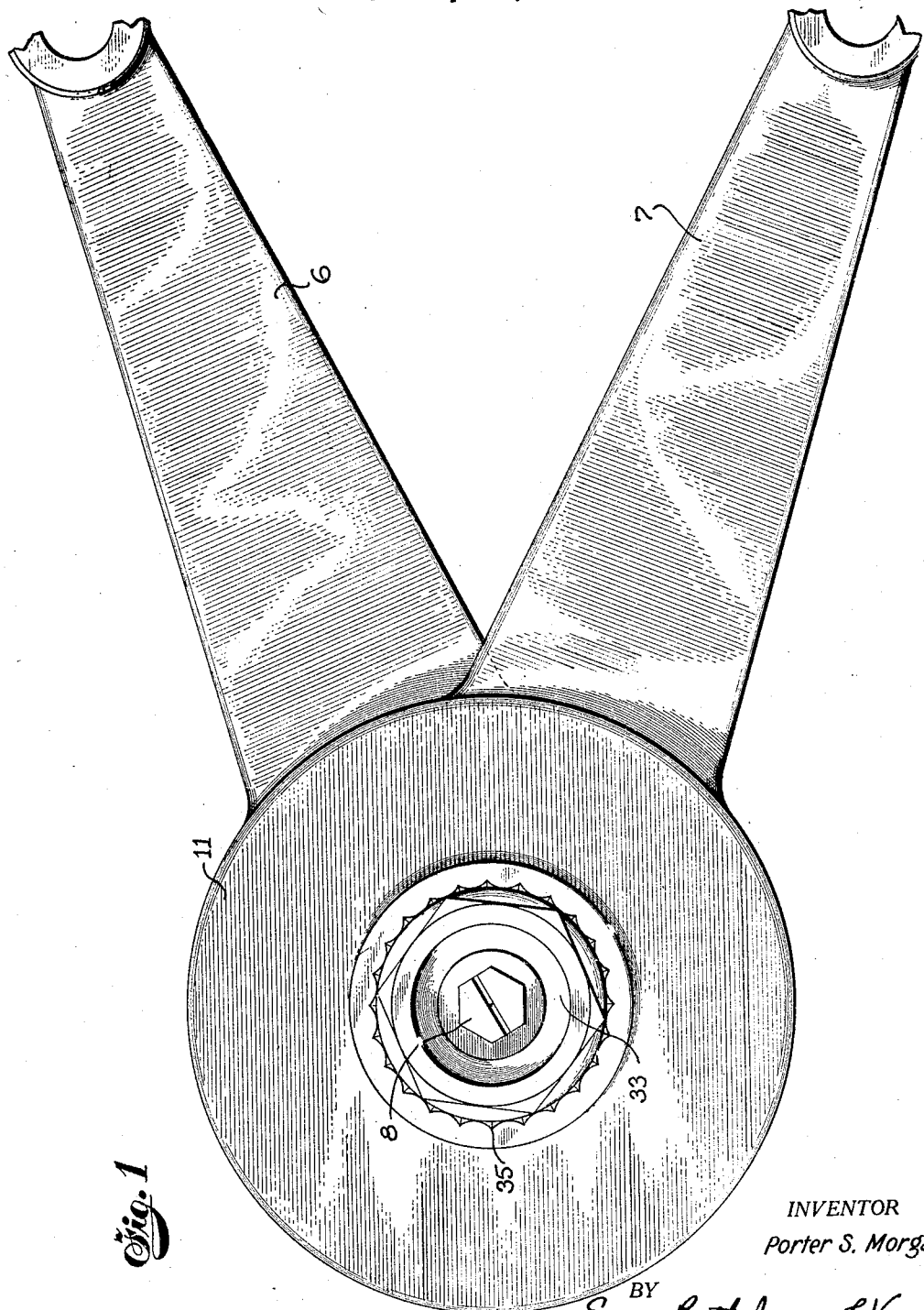
Figure 1 shows a side view of the assembled absorber with pivoted arms adapted for connection with the vehicle body and axle respectively.
Figure 3:
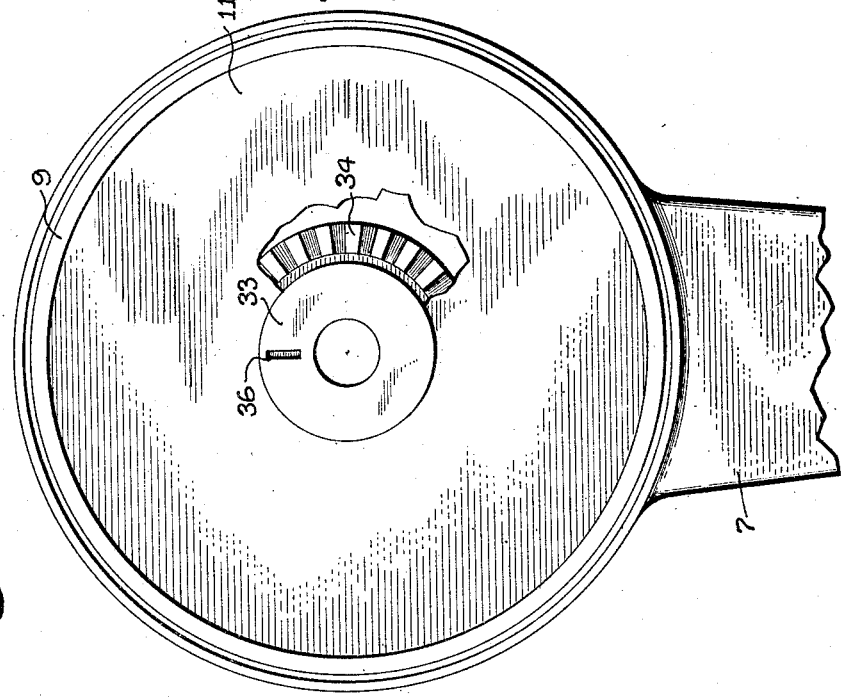
Figure 3 shows parts not shown in Figure 2.

In this specific embodiment of the invention the operation of the parts is such that the compression of the vehicle spring is moderated by a relatively gentle resistance which increases in proportion to the extent and velocity of the compression movement, and the consequent expansion of the spring is opposed and governed by a relatively strong resistance, firmly opposing the recoil of the spring where the expansive force of the spring is strong, and lessening in accordance with the diminishing power of the opening spring to the end that the spring may recoil at a desired and even rate. A feature of vehicle spring action not generally understood lies in the fact that undesirable rebound is caused not only by the extent of spring compression, but may be caused or affected by the speed at which compression takes place. A spring compression, if extended through a sufficiently long period of time, may not be objectionable in its resultant rebound and in many cases should be but gently resisted; while a rapid spring compression, though of less extent, may result in a sudden objectionable rebound which requires prompt and forceful resistance automatically varying with the decreasing force of the rebound action.

The embodiment of the present invention hereinafter described accomplishes not only retardation of the spring action variably effective in accordance with the extent of the spring movement, but also provides retardation variably effective in accordance with the rapidity of spring movement, with the result that objectionable spring motion due to extent of movement, rapidity of movement, or a component of the two, is suitably moderated and controlled.

Referring to the drawings, the arms 6 and 7 terminate respectively in integral cups 10 and 11, pivoted face to face which, secured by the bolt 8, form a circular casing to contain the absorber mechanism. The interior periphery of one of these cup-like casing members, 11, is shaped to fit rotatably within the opposite member, being provided for this purpose with a flange 9. Lying within and adjacent to the interior circumference of the flanged casing member 11, is the brake arc 12, which may be constructed of a band of brake fabric backed by a metal support 13, the ends of the brake arc being provided with metallic chocks 14 and 15.

These chocks are shaped and positioned to meet and fit the opposite sides of an arcuate abutment 16 made integral with the casing member 10, so that the brake arc, while having both ends free and unattached, is definitively positioned and non-floating, but is susceptible of expansion by relative clockwise movement of the chock 14 or counter-clockwise movement of the chock 15. Preferably, the brake arc support 13 is of steel, but should have no appreciable spring action of its own, its ideal characteristics comprising a sufficient stiffness and strength to translate motion of the chocks 14 and 15 into distributed expansive movement without buckling, it being unnecessary that it should possess intrinsic resiliency.

Journaled for governed oscillating movement between the casing members 10 and 11 is the driving member 17, here shown in the form of a relatively heavy steel wheel having a circular bore terminating in annular bearing members 18 and 19 adapted to fit corresponding bearing recesses formed in the casing members. The driving member 17 is provided with a projection 20 adapted to engage and fit between the brake chocks 14 and 15, so that any oscillating or turning movement of the driving member 17 is communicated to the brake arc, which tends to expand in accordance with and so be affected in its action by the force of such movement or oscillation.

In the under face of the driving member 17 are two oppositely disposed radial slots 21, 22 to receive roller bearings 23, 24 rotatably mounted upon the studs 25, 26 of the toothed sectors 27, 28. The sectors 27 and 28 are respectively pivoted upon the pins 29 and 30 firmly set in the casing member 10; while between and meshing with the toothed arcs of the sectors 27 and 28 is the toothed pinion 31 adapted to bear upon and oscillate about the central bolt 8. To permit this engagement between the sectors 27 and 28 and the pinion 31, opposite segments of the annular bearing member 19 are cut out thus providing openings for the entry of the toothed portions of the sectors.

The pinion 31 is provided with projecting arms in one of which is an opening 37 to receive the end of a powerful driving spring 32 which is disposed about the bolt 8 and within the central bore of the driving member 17. The opposite end of the spring enters an opening 36 in the face of the adjusting collar 33 which is provided with an annular toothed periphery 34 adapted to engage a similarly toothed annulus 35 integral with the casing member 11. This adjusting collar, once properly positioned, is held in place by the bolt 8 which passes through the collar and the casing members 10 and 11 to secure them and the various parts in proper operative position.

Figure 2:
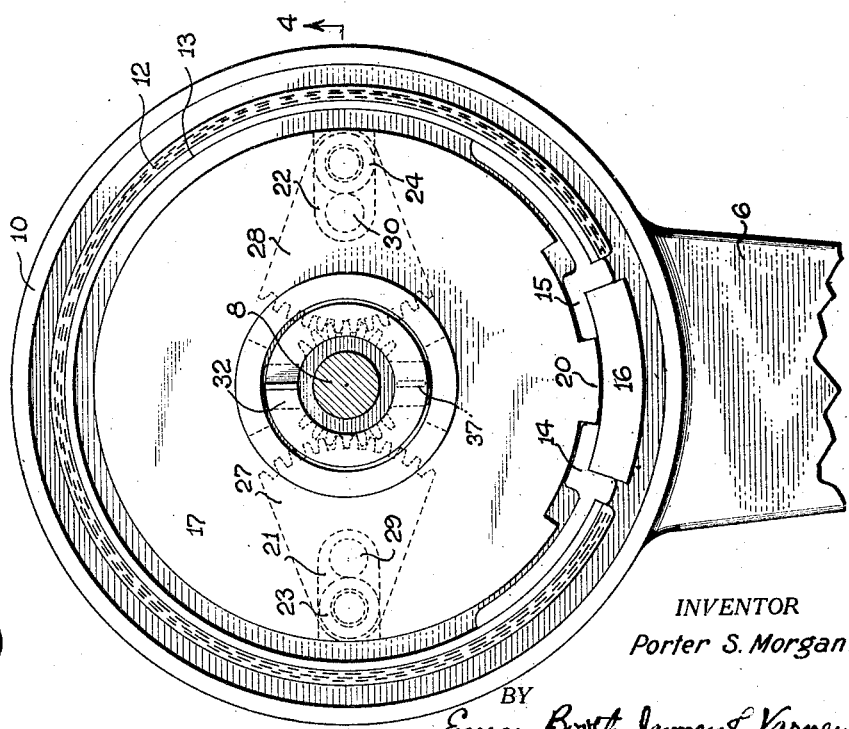
Figure 2 shows the absorber partially disassembled, one arm and its integral casing portion being removed to uncover the interior mechanism.
Figure 4:
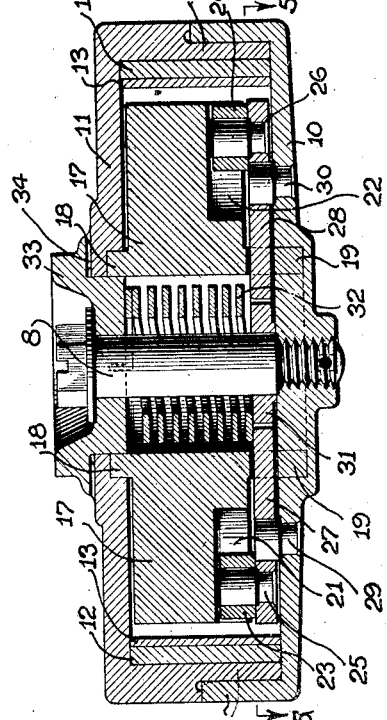
Figure 4 is a section taken on the line 4—4 of Figure 2.
Figure 5:
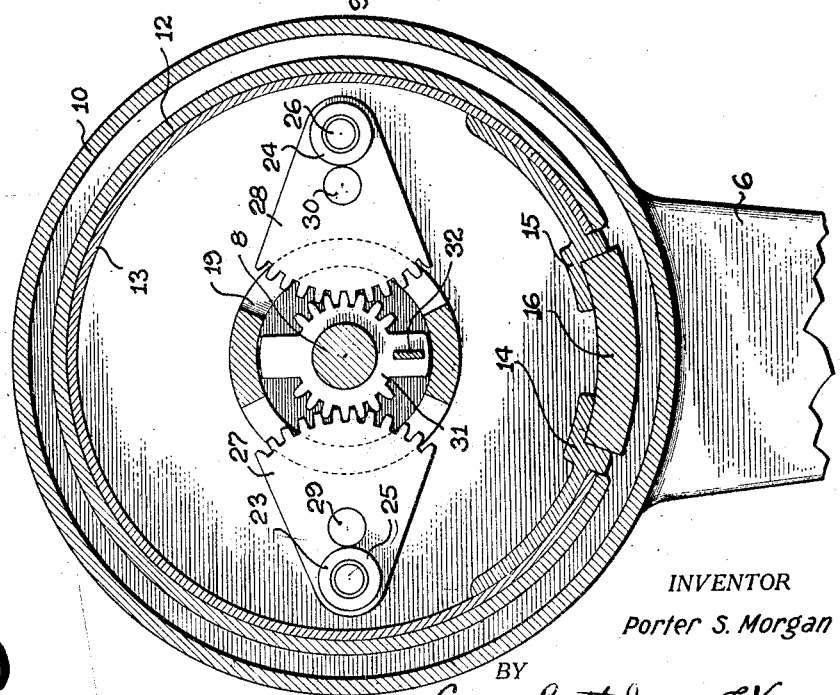
Figure 5 is a section taken on the line 5—5 of Figure 4.

In operation, the arms 6 and 7, respectively connected to the vehicle frame 40 and the axle 41, approach each other with a rapidity corresponding to the rapidity of the compression of the vehicle spring 42. This approaching movement results in the relative rotation of the casing members 10 and 11 integral with the arms. Considering, for purposes of demonstration, the arm 6 and its casing member 10 to be stationary, movement of the arm 7 towards the arm 6 results in a counter-clockwise rotation of the casing member 11 with reference to the parts as shown in Figures 2 and 5. This motion communicates a rotative urge to the spring 32 and through it to the pinion 31, to the pivoted sectors 27 and 28, and to the driving member 17, the weight of which thereby develops a power of momentum which is directed through the projection 20 to the chock 14 of the brake arc 12. Under this momentum urge, constantly accelerated by the continued and growing torque of the spring 32, the brake arc chock 14 is urged in a clockwise direction away from the abutment 16, the resultant expansive effort of the brake arc causing increasing pressure between the brake and the inner wall of the casing member 11 whereby there is increasing resistance to the closing of the arms 6 and 7. Since, however, the motion of the casing member 11 is opposite in direction to the urge upon the brake arc 12, binding action between the casing member and the brake arc is relatively small and resistance to the collapsing of the vehicle spring relatively gentle and insufficient to prevent relatively free movement, especially during the commencement of the collapsing motion.

When the rebound of the vehicle spring begins, however, the continued action of the friction mechanism causes the absorber to act strongly to resist the rebound movement. The continued urge upon the brake arc 12 is at a maximum, and is now in the same direction as that of the rotation of the casing member 11. The casing, in close frictional contact with the brake, tends to carry the brake with it, an action which is augmented by the released momentum of the driving member 17 pressing against the chock 14. In this manner binding action between the casing member 11 and the brake arc 12 is brought about and strongly resists the clockwise rotation of the casing 11, but gradually diminishes as the momentum of the driving member 17 spends its force and the rebounding strength of the vehicle spring grows weaker.

Thus it is apparent that the urge or action of the frictional resisting mechanism, initiated by the collapsing movement of the spring, continues, but with superior retardative effect during the rebound action; and that the strength and amount of resistance to the vehicle spring recoil is governed by the nature of the spring's movement when collapsing, so that regardless of the speed or extent of spring collapse (hence of spring rebound), the return of the vehicle spring to normal position is steady and governed in proportion to its changing force.

It is equally apparent that the absorber is operable in either direction, with either arm, 6 or 7, uppermost, it being only necessary upon changing the relative position of the arms to substitute for the spring 32 a similar spring wound in the opposite direction.

While one embodiment of the invention has been illustrated and described, the scope of the invention is not limited thereto.

Claims:

1. A shock absorber comprising in combination a pair of arms, casing members respectively integral therewith and adapted to be pivoted together to form an enclosure for other operative parts, a circular frictional surface provided by the inner periphery of one of said casing members, an arcuate brake member positioned within and concentrically with said periphery and provided at its ends with chocks, an abutment integral with the other casing member located between the ends of said arcuate brake member and against which said chocks abut, a weight wheel journalled in said casing members and adapted for oscillatory movement therebetween, a projection upon said weight wheel extending between said chocks whereby motion or stress may be imparted to the same and to said brake member upon oscillation of said weight wheel, radial slots in the weight wheel, toothed sectors pivoted to the last-named casing member and provided with roller-bearings to engage said slots, a toothed pinion rotatably mounted between and in mesh with the toothed arcs of said sectors, a helical spring connected at one end with said pinion and at the other with an adjusting collar, teeth upon said adjusting collar, similar teeth upon the first-named casing member adapted to engage the teeth on said adjusting collar to hold the same in fixed relation to said first-named casing member, and a central bolt passing through said collar and through said casing members to hold the same and their contained parts in operative position.

2. A shock absorber comprising in combination a pair of arms, casing members respectively integral therewith and adapted to be pivoted together to form an enclosure for other operative parts, a frictional surface upon one of said casing members, an arcuate brake member positioned within and contiguous to said surface, an abutment integral with the other casing member located between the ends of said arcuate brake member, a weight member operatively positioned within said enclosure and adapted for oscillatory movement, a projection upon said weight member extending between the ends of said brake member whereby motion or stress may be imparted to said brake member to expand the same, toothed sectors pivoted to the last-named casing member and operatively connected to said weight member, a toothed pinion operatively connected with said sectors, a helical spring operatively connected with said pinion and with said first-named casing member, and means for adjusting said spring in relation to said first-named casing member.

3. A shock absorber comprising in combination a pair of arms, casing members respectively integral therewith and adapted to be pivoted together, a frictional surface upon one of said casing members, a brake member contiguous to said surface, means for preventing relative movement between a part of said brake member and the other casing member, a weight member adapted to act upon said brake member to force it into operative contact with said frictional surface, and means including a spring connecting said weight member with the other casing member whereby a relative approaching movement of said arms will actuate said weight member.

4. A shock absorber comprising in combination a pair of arms, casing members respectively integral therewith and adapted to be pivoted together, a frictional surface upon one of said casing members, a brake member contiguous to said surface, means for preventing relative movement between a portion of said brake member and the other casing member, a momentum member adapted to act upon said brake member to effect its operative contact with said frictional surface, and means connecting said momentum member with the other casing member whereby a relative approaching movement of said arms will actuate said momentum member.

5. A shock absorber comprising in combination a pair of arms pivoted to each other, a frictional surface operatively integral with one of said arms, a brake member held in operative position by the other arm and adapted to contact with said friction surface, and a weight member operatively connected to the first-named arm adapted to actuate said brake member upon relative movement of said arms.

6. A shock absorber comprising in combination a pair of arms pivoted to each other, a frictional surface operatively integral with one of said arms, a brake member held in operative position by the other arm and adapted to contact with said friction surface, and a momentum member operatively connected to the first-named arm adapted to actuate said brake member upon relative movement of said arms.

7. A shock absorber comprising in combination means for operatively connecting it to the body of the vehicle and the running gear, friction means for resisting relative movement between said vehicle body and said running gear, and weight means actuated by relative movement between said vehicle body and said running gear to control or modify the effective action of said friction means.

8. An anti-vibration device adapted to be interposed between relatively movable parts of a vehicle having elastic suspension means, said device comprising a friction mechanism arranged to be applied and released during operation and an operative connection between said mechanism and one of said relatively movable vehicle parts, said connection being capable of transmitting power functionally to apply said friction mechanism in one direction of movement and being functionally operative upon the reverse movement for the same purpose.

9. An anti-vibration device adapted to be interposed between the body and running gear of a vehicle having spring suspension means, said device comprising a friction mechanism operatively connected with a vehicle part movable relatively thereto and arranged to be applied and released during operation, said connection acting to transmit power to apply said friction mechanism during the compression movement of the spring and diminishingly to sustain such power with regulating effect during the recoil movement of the spring.

10. An anti-vibration device comprising a frictional controlling mechanism for a vehicle body-supporting spring capable of exerting frictional resistance to movements of the spring, and means comprising a weight rotatable on its central axis for delivering power to said device by the movement of the spring in one direction varyingly effective in accordance with the speed of said movement to retard the succeeding movement of the spring in the other direction.

11. An anti-vibration device comprising a frictional controlling mechanism for a vehicle body-supporting spring capable of exerting frictional resistance to movements of the spring, and means for initiating the action of said device during movement of the spring in one direction and continuing said action to retard the succeeding movement of the spring in the other direction including a momentum member rotatable about its center of gravity.

12. An anti-vibration device comprising a frictional controlling mechanism for a vehicle body-supporting spring capable of exerting frictional resistance to movements of the spring and means including a momentum member rotatable about its center of gravity for initiating the action of said device during movement of the spring in one direction and continuing action to retard the succeeding movement of the spring in the other direction.

13. A shock absorber comprising in combination pivotally connected arms 6 and 7; a brake member 12 operative to oppose relative movement of the arms; a brake-actuating weight 17 mounted to rotate on its central axis; and connections between said weight 17 and the pivoted arm 7 normally urging the weight in one direction relative to arm 7 comprising a spring 32, a pinion 31 connected to and actuated by the spring, and a gear segment 28 connected to be actuated by the pinion and arranged to rotate the weight substantially as described.

14. An anti-vibration device adapted to be interposed between the body and running gear of a vehicle having spring suspension means, said device comprising an expansible friction member and an operative connection between the friction member and a vehicle part, said connection acting to transmit expansive force to said member during the compression movement of the spring.

15. An anti-vibration device comprising a frictional controlling mechanism for a vehicle body-supporting spring capable of exerting frictional resistance to movements of the spring by expansion, and means for delivering expansive power to said device by the movement of the spring in one direction to retard the succeeding movement of the spring in the other direction.

16. A shock absorber comprising in combination a pair of arms, members respectively integral therewith and adapted to be pivoted together, a frictional surface upon one of said members, a brake member contiguous to said surface, means for preventing relative movement between a portion of said brake member and the other member, a momentum member adapted to act upon said brake member to effect its operative contact with said frictional surface, and means in connection with said momentum member whereby a relative approaching movement of said arms will cause the momentum member to effect the operative contact of said brake member with said frictional surface during a portion of the separating movement of said arms.

17. A shock absorber comprising in combination a pair of arms, members respectively integral therewith and adapted to be pivoted together, a frictional surface upon one of said members, a brake member contiguous to said surface, a momentum member adapted to act upon said brake member to effect its operative contact with said frictional surface, and means in connection with said momentum member whereby a relative approaching movement of said arms will cause the momentum member to effect the operative contact of said brake member with said frictional surface during a portion of the separating movement of said arms.

18. An anti-vibration device comprising a frictional controlling mechanism for a vehicle body-supporting spring capable of exerting relatively light frictional resistance to movements of the spring in one direction and relatively heavy frictional resistance to movements of the spring in the other direction, and momentum means for charging said device with power during the movement of the spring in one direction to retard the succeeding movement of the spring in the other direction.

19. An anti-vibration device comprising a frictional controlling mechanism for a vehicle body-supporting spring capable of resisting spring movements, and momentum means adapted to charge said device with power during movement of the spring in one direction to retard the succeeding movement of the spring in the other direction.

20. A shock absorber comprising in combination means to connect said absorber to relatively movable parts of a vehicle, expansible friction means for resisting relative movement between said parts and momentum means operated by the movement of either part toward the other part to effect the expansion of said friction means.

21. A shock-absorber comprising in combination means of connection between the vehicle body and the running-gear, means for resisting movement of the vehicle body away from the wheels or running gear, and means whereby this resisting action is affected by and in accordance with the rapidity of the motion of the vehicle body towards the running-gear.

22. A non-hydraulic shock-absorber comprising in combination means of connection between the vehicle body and the running-gear, friction means for resisting movement of the running gear away from the vehicle body, and means whereby the friction of this resisting action is affected by and in accordance with the speed of relative motion between the running gear and the vehicle body.

23. A shock-absorber comprising in combination means of connection between the vehicle body and the running-gear, friction means for resisting relative movement between the vehicle body and the running-gear in either direction, and means whereby the friction of this resisting action is affected by and in accordance with the speed of relative movement between the vehicle body and the running-gear in either direction.

24. A shock absorber comprising in combination a pair of arms, casing members respectively integral therewith, a pivot pin connecting the casing members for relative angular movement, a brake member operable to resist such angular movement, an inertia member rotatable about the pivot pin operatively connected to the brake member and arranged upon angular movement of one of the casing members relative to the inertia member to actuate the brake member to resist relative angular movement of the casings, and means acting yieldably to rotate the inertia member.

25. A shock absorber comprising in combination a pair of casing members pivotally connected for relative angular movement, an inertia member rotatably mounted within said casing members, a brake band operatively connected to said inertia member to be actuated upon relative angular movement between the inertia member and one casing member to apply the brake band to resist relative angular movement of the casing members.

26. A shock absorber comprising in combination a pair of pivotally connected arms having mating casing members at their inner ends concentric with the pivotal connection, a brake band within one casing member arranged to engage the same with a braking action, the other casing member having a projection extending between the ends of the brake band, an inertia member movably mounted within the casing members and having a projection extending between the ends of the brake band whereby upon angular movement of the said other casing member relative to the inertia member, the brake band will be expanded by the relatively moving projections to resist pivotal movement of the casing members.

27. A shock absorber comprising in combination angularly movable members, one of which comprises a brake drum, a pivot pin connecting said members for relative angular movement, a brake band arranged to engage said brake drum and means including an inertia member rotatably mounted on said pivot pin for actutaing the brake band to engage said brake drum upon relative angular movement between one member and said inertia member.

28. A shock absorber comprising in combination angularly movable pivotally connected members, a brake operable to resist relative angular movement of said members, means including a concentric inertia member for actuating the brake first to brake with greater power and later to brake with less power during relative angular movement in one direction.

29. A shock absorber for use between the vehicle body and running gear comprising in combination pivotally connected members, a brake band operable to resist relative angular movement of said members, means including an inertia member for applying said brake upon movement of the running gear toward the body and a spring cooperating with the inertia member and acting thereon continuously during the greater part of the return movement of said pivotally connected members to initial position.

30. A shock absorber comprising in combination angularly movable members coacting to form a casing, a pivot pin connecting said members, an inertia member concentrically mounted on said pin, a brake band concentrically mounted within the casing, one of said members having a brake drum arranged to be engaged by said brake band, the other member being provided with a lug projecting between spaced ends of said brake band, the inertia member also having a projection engaging between the spaced ends of said brake band whereby upon movement of the second member in either direction relative to the inertia member, the brake band will be operatively applied to said brake drum and will continue to resist relative pivotal movement of said members until the inertia member moves.

31. A shock absorber comprising in combination angularly movable members coacting to form a casing, a pivot pin connecting said members, an inertia member concentrically mounted on said pin, a brake band concentrically mounted within the casing, one of said members having a brake drum arranged to be engaged by said brake band, the other member being provided with a lug projecting between spaced ends of said brake band, the inertia member also having a projection engaging between the spaced ends of said brake band whereby upon movement of the second member in either direction relative to the inertia member, the brake band will be operatively applied to said brake drum and will continue to resist relative pivotal movement of said members until the inertia member moves, and a spring tending to yieldably control the position of said inertia member.

32. A shock absorber comprising in combination angularly movable pivotally connected members, an inertia member mounted to rotate about its center of gravity, and a brake connected to one angularly movable member and to the inertia member to be actuated by relative angular movement between that member and the inertia member.

33. In apparatus of the character described, the combination with a chassis and running gear of a spring yieldably connecting the same, and a shock absorber also connecting the same said shock absorber comprising pivotally connected members, a brake operable to resist pivotal movement to said members, and means for applying said brake during the rebound of said spring comprising an inertia member engageable with said brake to apply said brake and a spring operable to move said inertia member to a position for applying the brake during the rebound and to keep it applied during continued rebound.

34. A shock absorber comprising relatively movable members, a brake for resisting relative movement of said members and means for applying the brake comprising an inertia member supported for angular movement about its center of gravity.

35. A shock absorber comprising angularly movable members, a brake drum associated with one of said members, a brake band engageable with said drum, an inertia member mounted to move angularly about its center of gravity, and means cooperating with the inertia member to apply the brake band to the brake drum upon relative angular movement between one of the angularly movable members and the inertia member.

36. A shock absorber comprising relatively movable members, a brake operable to resist relative movement of said members, and means comprising an inertia member mounted to move angularly about its center of gravity to control the application of the brake.

37. A shock absorber comprising members connected for relative angular movement, a brake operable to resist relative angular movement of said members, and means comprising an inertia member mounted to rotate about its center of gravity to control the application of said brake.

38. A shock absorber comprising relatively movable members, a brake operable to resist relative movement of said members, means comprising an inertia member mounted to move angularly about its center of gravity to control the application of the brake, and yieldable means cooperating with said inertia member to move it angularly.

39. A shock absorber comprising relatively movable members, a brake operable to resist the relative movement of said members, an inertia member mounted to move angularly about its center of gravity and arranged to cooperate with one of said relatively movable members to apply the brake, and a yieldable means connected to the other relatively movable member and the inertia member to move the latter.

40. A shock absorber comprising a pair of pivotally connected arms arranged for connection at their free ends to the body and running gear respectively of a vehicle, a brake arranged to resist relative pivotal movement of the arms, controlling means for said brake comprising an inertia member concentrically mounted to move angularly about its center of gravity at the point of pivotal connection of the arms.

41. A shock absorber comprising a pair of pivotally connected arms, a brake arranged to resist relative pivotal movement of the arms, and means for controlling the application of the brake comprising an inertia member and a spring cooperating with said inertia member and arranged to operate with a tension proportional to the extent of relative movement of said arms from normal position.

42. A shock absorber comprising in combination means for operatively connecting it to the body of the vehicle and the running-gear, friction means for resisting relative movement between said vehicle body and said running gear, and weight means actuated by movement of the running-gear toward or from the vehicle body to control or modify the effective action of said friction means.

43. A shock absorber comprising in combination means for operatively connecting it to the body of the vehicle and the running gear, friction means for resisting relative movement between said vehicle body and said running gear, and weight means actuated by vertical movement of the running gear relative to the body of said vehicle to control or modify the effective action of said friction means.

44. A shock absorber comprising in combination means for operatively connecting it to the body of the vehicle and the running gear, friction means for resisting relative movement between said vehicle body and said running gear and weight means actuated by relative movement between said vehicle and said running gear to apply the friction of said friction means.

45. A shock absorber comprising friction means for resisting relative movement between the vehicle body and the running gear, said friction means being normally not applied, and weight actuating means actuated by relative movement between said vehicle body and said running gear to apply said friction means.

In testimony whereof, I have signed my name to this specification this 5th day of April, 1923.

PORTER S. MORGAN.